(12) United States Patent
Miyairi et al.

(10) Patent No.: US 12,305,551 B2
(45) Date of Patent: May 20, 2025

(54) FILTER AND METHOD FOR MANUFACTURING SAME

(71) Applicant: NGK INSULATORS, LTD., Nagoya (JP)

(72) Inventors: Yukio Miyairi, Nagoya (JP); Koji Fukuyo, Nagoya (JP); Tasuku Matsumoto, Kasugai (JP); Shuichi Ichikawa, Nagoya (JP); Suguru Kodama, Nagoya (JP); Ryuta Kono, Nagoya (JP); Narimasa Shinoda, Ichinomiya (JP); Rui Horimoto, Ichinomiya (JP)

(73) Assignee: NGK INSULATORS, LTD., Nagoya (JP)

(*) Notice: Subject to any disclaimer, the term of this patent is extended or adjusted under 35 U.S.C. 154(b) by 792 days.

(21) Appl. No.: 16/889,076

(22) Filed: Jun. 1, 2020

(65) Prior Publication Data

US 2020/0386134 A1 Dec. 10, 2020

(30) Foreign Application Priority Data

Jun. 4, 2019 (JP) .................................. 2019-104854
Apr. 1, 2020 (JP) ................................. 2020-066203

(51) Int. Cl.
*B01D 46/24* (2006.01)
*C04B 35/565* (2006.01)
(Continued)

(52) U.S. Cl.
CPC ....... *F01N 3/0222* (2013.01); *B01D 46/2429* (2013.01); *B01D 46/24491* (2021.08);
(Continued)

(58) Field of Classification Search
CPC ....................... B01D 46/2498; B01D 46/2478
See application file for complete search history.

(56) References Cited

U.S. PATENT DOCUMENTS 8,241,725 B2 * 8/2012 Hiramatsu .......... C04B 35/6316
428/116
2003/0143370 A1 7/2003 Noguchi et al.
(Continued)

FOREIGN PATENT DOCUMENTS

| CN | 1434001 A | 8/2003 |
| CN | 1628210 A | 6/2005 |

(Continued)

OTHER PUBLICATIONS

German Office Action (Application No. 10 200 206 866.6) dated Feb. 10, 2021 (with English translation).
(Continued)

*Primary Examiner* — Humera N. Sheikh
*Assistant Examiner* — Julia L Rummel
(74) *Attorney, Agent, or Firm* — BURR PATENT LAW, PLLC

(57) ABSTRACT

A filter including a plurality of pillar-shaped honeycomb structure segments made of porous ceramics, side faces of the segments being bonded together via a bonding material, wherein each of the pillar-shaped honeycomb structure segments includes an outer peripheral side wall, and partition walls partitioning a plurality of cells extending from a first end face to a second end face, and in each of the pillar-shaped honeycomb structure segments, an average porosity of the outer peripheral side wall is lower than that of the partition walls.

16 Claims, 2 Drawing Sheets

(51) Int. Cl.
  *F01N 3/022* (2006.01)
  *F01N 3/20* (2006.01)
  *C04B 111/00* (2006.01)

(52) U.S. Cl.
  CPC ... *B01D 46/24492* (2021.08); *B01D 46/2474* (2013.01); *B01D 46/2476* (2021.08); *B01D 46/2478* (2021.08); *B01D 46/2482* (2021.08); *C04B 35/565* (2013.01); *F01N 3/2066* (2013.01); *C04B 2111/00793* (2013.01)

(56) References Cited

U.S. PATENT DOCUMENTS

| | | |
|---|---|---|
| 2004/0097370 A1 | 5/2004 | Ichikawa et al. |
| 2005/0109023 A1 | 5/2005 | Kudo et al. |
| 2005/0214503 A1 | 9/2005 | Sakamoto |
| 2006/0032203 A1 | 2/2006 | Komori et al. |
| 2007/0092692 A1* | 4/2007 | Masukawa ............ F01N 3/0222 428/116 |
| 2007/0130897 A1 | 6/2007 | Sakaguchi et al. |
| 2008/0202086 A1 | 8/2008 | Ohno et al. |
| 2009/0022942 A1* | 1/2009 | Hiramatsu ............ C04B 35/18 428/116 |
| 2009/0022944 A1* | 1/2009 | Watanabe ............ C04B 35/111 428/116 |
| 2016/0074800 A1 | 3/2016 | Ito et al. |
| 2017/0057196 A1 | 3/2017 | Mori et al. |
| 2018/0099240 A1 | 4/2018 | Mori et al. |

FOREIGN PATENT DOCUMENTS

| | | |
|---|---|---|
| CN | 1723339 A | 1/2006 |
| CN | 101061293 A | 10/2007 |
| CN | 101306282 A | 11/2008 |
| EP | 1 982 767 A1 | 10/2008 |
| JP | 2003-155908 A | 5/2003 |
| JP | 2007-117792 A | 5/2007 |
| JP | 5649836 B2 | 1/2015 |
| JP | 2016-055282 A1 | 4/2016 |
| JP | 2017-047372 A | 3/2017 |
| JP | 2018-061926 A | 4/2018 |

OTHER PUBLICATIONS

German Office Action (with English translation), German Application No. 10 2020 008 058.8, dated May 2, 2022 (7 pages).
Chinese Office Action (with English translation), Chinese Application No. 202010483333.X, dated Aug. 23, 2022 (21 pages).
Japanese Office Action (with English translation) dated Dec. 5, 2023 (Application No. 2020-066203).

* cited by examiner

FILTER AND METHOD FOR MANUFACTURING SAME

FIELD OF THE INVENTION

The present invention relates to a filter having a structure in which side faces of pillar-shaped honeycomb structure segments made of porous ceramics are bonded together via a bonding material. The invention also relates to a method for producing such a filter.

BACKGROUND OF THE INVENTION

Particulate matter (hereinafter referred to as PM) in exhaust gas discharged from internal combustion engines such as diesel engines and gasoline engines includes soot. Soot is harmful to the human body and its emission is regulated. At present, in order to comply with exhaust gas regulations, filters typified by DPFs and GPFs that pass exhaust gas through air-permeable small-pore partition walls and filtrate PM such as soot have been widely used.

As a filter for trapping PM, since a high PM trapping efficiency can be obtained while suppressing the pressure loss within an acceptable range, a filter having a pillar-shaped honeycomb structure which comprises an outer peripheral side wall and partition walls for partitioning a plurality of cells extending from a first end face to a second end face is widely used. The filter may support various types of catalysts such as an SCR catalyst in order to simultaneously provide an exhaust gas purifying function such as NOx purifying in addition to the PM trapping function. In a generally adopted method of supporting a catalyst on a filter having a pillar-shaped honeycomb structure, a catalyst slurry is introduced into the cells by a conventionally publicly known suction method or the like, and attached to the surface or pores of the partition walls, and then subjected to a high-temperature treatment for baking the catalyst contained in the catalyst slurry on the partition walls.

In Patent Literature 1 (Japanese Patent No. 5649836), it is described that, for the purpose of providing a honeycomb catalyst body having a low pressure loss and excellent exhaust gas purification performance, the cell shape is made hexagonal, the thickness of the partition walls, the cell pitch, the porosity of the partition walls, the amount of the supported catalyst, and the average pore diameter are controlled.

In Patent Literature 2 (Japanese Patent Application Publication No. 2016-55282), there is described an invention for providing a honeycomb structure wherein, the catalyst slurry can be prevented from seeping out to the outer surface of the outer peripheral wall, and the strength of the outer peripheral wall is improved, and as a result, the isostatic strength of the entire structure is improved. According to this invention, a coat layer is provided on the outer surface of the outer peripheral wall of the honeycomb substrate, and a part of the coat layer has penetrated the pores of the outer peripheral wall. When the thickness of the portion of the coat layer penetrating into the pores of the outer peripheral wall is 1 to 90% of the thickness of the outer peripheral wall, pores in the outer peripheral wall are closed.

According to the invention described in Patent Literature 2, the following effects can be obtained. Even when a honeycomb base material having a high porosity of 50% or more is used, when a catalyst slurry is introduced into the cells, the slurry does not seep out to the outer surface of the outer peripheral wall, and good workability is obtained in the step of supporting the catalyst on the partition walls of the honeycomb structure. Further, since the coat layer reinforces the outer peripheral wall, the strength of the outer peripheral wall is improved, and in the step of supporting the catalyst on the honeycomb structure, breakage of the outer peripheral wall when a part of the outer peripheral wall of the honeycomb structure is chucked (gripped) can be effectively prevented. Further, as a result of improvement in the strength of the outer peripheral wall, the isostatic strength of the entire honeycomb structure is also improved, and breakage during transportation or actual use of the honeycomb structure can be effectively prevented.

CITATION LIST

Patent Literature

[Patent Literature 1] Japanese Patent No. 5649836
[Patent Literature 2] Japanese Patent Application Publication No. 2016-55282

SUMMARY OF THE INVENTION

In some cases, a filter having a pillar-shaped honeycomb structure is used by integrally bonding side faces of a plurality of pillar-shaped honeycomb structure segments with a bonding material in order to improve thermal shock resistance. In this case, by providing a coat layer taught in Patent Literature 2 on the outer peripheral side wall of a filter formed by bonding a plurality of pillar-shaped honeycomb structure segments, the effect described in Patent Literature 2, that is, the effect of improving the workability when introducing the catalyst slurry into the cells and the effect of preventing breakage when the honeycomb structure is chucked can be obtained, can be expected.

On the other hand, both Patent Literature 1 and Patent Literature 2 lack in study for improving the catalytic performance in the cases where the side faces of a plurality of pillar-shaped honeycomb structure segments are bonded together with a bonding material and used integrally.

In view of the above circumstances, in one embodiment, an object of the present invention is to provide a filter in which side faces of a plurality of pillar-shaped honeycomb structure segments made of porous ceramics are bonded together via a bonding material, and which can contribute to improvement in catalytic performance. Further, in another embodiment, an object of the present invention is to provide a method for manufacturing such a filter.

In a filter in which side faces of a plurality of pillar-shaped honeycomb structure segments made of porous ceramics are bonded together via a bonding material, the side faces correspond to the outer surface of the outer peripheral side wall of each pillar-shaped honeycomb structure segment. Therefore, the bonding material is interposed between the outer peripheral side walls of the adjacent pillar-shaped honeycomb structural segments. Since the outer peripheral side wall portions of the pillar-shaped honeycomb structure segments adjacent to each other via the bonding material exist not on the outer peripheral portion of the filter but on the inner side thereof, when a coat layer as taught in Patent Literature 2 is provided on this outer peripheral side wall portion, the effect of improving the workability when introducing a catalyst slurry into the cells and the effect of preventing breakage when the honeycomb structure is chucked cannot be obtained.

On the other hand, it has been found that, when the catalyst slurry is introduced into a filter in which the side faces of a plurality of pillar-shaped honeycomb structure segments made of porous ceramics are bonded together via a bonding material, the catalyst slurry was filled in the outer peripheral side wall portions of the pillar-shaped honeycomb structure segments adjacent to each other via the bonding material. Further, it has been found that the catalyst slurry may pass through the outer peripheral side wall and be filled in the bonding material. The catalyst supported on the outer peripheral side wall and the bonding material cannot exhibit catalytic performance, and hardly contributes to exhaust gas purification. For this reason, a part of the introduced catalyst is wasted, and the exhaust gas purification performance is deteriorated.

The present inventors have made intensive studies and found that, in each pillar-shaped honeycomb structure segment, by making the average porosity of the outer peripheral side wall lower than the average porosity of the partition walls, and/or by setting the average thickness of the outer peripheral side wall to be a predetermined ratio with respect to the average thickness of the partition walls, it becomes difficult for the catalyst to be supported on the outer peripheral side wall and the bonding material. On the other hand, it has been found that the ratio of the catalyst supported on the partition walls that contributes to the improvement of the exhaust gas purification performance increases. The present invention has been completed based on this finding, and is exemplified below.

(1) A filter comprising a plurality of pillar-shaped honeycomb structure segments made of porous ceramics, side faces of the segments being bonded together via a bonding material, wherein each of the pillar-shaped honeycomb structure segments comprises an outer peripheral side wall, and partition walls partitioning a plurality of cells extending from a first end face to a second end face, and in each of the pillar-shaped honeycomb structure segments, an average porosity of the outer peripheral side wall is lower than that of the partition walls.

(2) A filter comprising a plurality of pillar-shaped honeycomb structure segments made of porous ceramics, side faces of the segments being bonded together via a bonding material, wherein each of the pillar-shaped honeycomb structure segments comprises an outer peripheral side wall, and partition walls partitioning a plurality of cells extending from a first end face to a second end face, and in each of the pillar-shaped honeycomb structure segments, an average thickness of the outer peripheral side wall is 0.5 times or more and 1.2 times or less as thick as that of the partition walls.

(3) A filter comprising a plurality of pillar-shaped honeycomb structure segments made of porous ceramics, side surfaces of the segments being bonded together via a bonding material, wherein each of the pillar-shaped honeycomb structure segments comprises an outer peripheral side wall, and partition walls partitioning a plurality of cells extending from a first end face to a second end face, and in each of the pillar-shaped honeycomb structure segments, an average porosity of the outer peripheral side wall is lower than that of the partition walls, and in each of the pillar-shaped honeycomb structure segments, an average thickness of the outer peripheral side wall is 0.5 times or more and 1.2 times or less as thick as that of the partition walls.

(4) The filter according to any one of (1) to (3), wherein in each of the pillar-shaped honeycomb structure segments, the outer peripheral side wall is such that an average porosity of a region having a thickness of 20% or more of the outer peripheral side wall inward from an outermost peripheral portion of the outer peripheral side wall is lower than that of the partition walls.

(5) The filter according to any one of (1) to (3), wherein in each of the pillar-shaped honeycomb structure segments, the outer peripheral side wall is such that an average porosity of a region having a thickness of 20% or more of the outer peripheral side wall inward from an outermost peripheral portion of the outer peripheral side wall is no more than half of that of the partition walls.

(6) The filter according to any one of (1) to (3), wherein in each of the pillar-shaped honeycomb structure segments, the outer peripheral side wall is such that an average porosity of a region having a thickness of 20% or more of the outer peripheral side wall inward from an outermost peripheral portion of the outer peripheral side wall is 25% or less of that of the partition walls.

(7) The filter according to any one of (1) to (6), wherein the outer peripheral side wall of each of the pillar-shaped honeycomb structure segments is such that, an average porosity of a region having a thickness of 50% of the outer peripheral side wall outward from an innermost peripheral portion of the outer peripheral side wall is higher than that of a region having a thickness of 50% of the outer peripheral side wall inward from an outermost peripheral portion of the outer peripheral side wall.

(8) The filter according to any one of (1) to (7), wherein in each of the pillar-shaped honeycomb structure segments, a difference between an average porosity of a region having a thickness of 10% of the outer peripheral side wall outward from an innermost peripheral portion of the outer peripheral side wall and an average porosity of the partition walls is within 5%.

(9) The filter according to any one of (1) to (8), wherein in each of the pillar-shaped honeycomb structure segments, at least a part of pores of the outer peripheral side wall is filled with a filler.

(10) The filter according to (9), wherein the filler comprises aggregate particles, and the aggregate particles comprise as a main component one or a mixture of two or more selected from a group consisting of alumina, silica, zirconia, silicon carbide, aluminum titanate, silicon nitride, and cordierite.

(11) The filter according to (9), wherein the filler comprises a metallic Si as a main component.

(12) The filter according to any one of (1) to (11), wherein a SCR catalyst is supported on the partition walls of each of the pillar-shaped honeycomb structure segments.

(13) The filter according to any one of (1) to (12), wherein the average porosity of the partition walls of each of the pillar-shaped honeycomb structure segments is 50% to 70%.

(14) The filter according to any one of (1) to (13), wherein an average pore diameter of the partition walls of each of the pillar-shaped honeycomb structure segments is 7 µm to 23 µm.

(15) A method for manufacturing a filter according to any one of (1) to (14), comprising:

a step 1A of preparing a plurality of pillar-shaped honeycomb structure segments made of porous ceramics having an outer peripheral side wall and partition walls disposed on an inner side of the outer peripheral side wall and partitioning a plurality of cells extending from a first end face to a second end face;

a step 2A of impregnating each of the pillar-shaped honeycomb structure segments made of porous ceramics with a slurry comprising aggregate particles and a solvent from an outermost peripheral portion of the outer peripheral side wall toward the inner side, and thereafter firing to obtain a plurality of pillar-shaped honeycomb structure segments made of porous ceramics in which an average porosity of the outer peripheral side wall is lower than that of the partition walls; and a step 3A of bonding via a bonding material side faces of the pillar-shaped honeycomb structure segments made of porous ceramics in which the average porosity of the outer peripheral side wall is lower than that of the partition walls.

(16) The method for manufacturing a filter according to (15), wherein an average particle diameter of the aggregate particles is 2% to 60% of an average pore diameter of the outer peripheral side wall before the impregnation with the slurry.

(17) The method for manufacturing a filter according to (15) or (16), wherein the slurry comprises a pore forming material at a concentration of 0.5% by mass or less.

(18) The method for manufacturing a filter according to any one of (15) to (17), wherein the step 2A comprises applying the slurry to the outermost peripheral portion of the outer peripheral side wall for each of the pillar-shaped honeycomb structure segments made of porous ceramics.

(19) The method for manufacturing a filter according to any one of (15) to (17), wherein the step 2A comprises a step of entirely immersing each of the pillar-shaped honeycomb structure segments made of porous ceramics in the slurry after sealing both of the end faces.

(20) A method for manufacturing a filter according to any one of (1) to (14), comprising:

a step 1B of preparing a plurality of pillar-shaped honeycomb structure segments made of porous ceramics having an outer peripheral side wall and partition walls disposed on an inner side of the outer peripheral side wall and partitioning a plurality of cells extending from a first end face to a second end face;

a step 2B of impregnating each of the pillar-shaped honeycomb structure segments made of porous ceramics with a metallic Si from an outermost peripheral portion of the outer peripheral side wall toward the inner side, and thereafter firing to obtain a plurality of pillar-shaped honeycomb structure segments made of porous ceramics in which an average porosity of the outer peripheral side wall is lower than that of the partition walls; and a step 3B of bonding via a bonding material side faces of the pillar-shaped honeycomb structure segments made of porous ceramics in which the average porosity of the outer peripheral side wall is lower than that of the partition walls.

(21) A method for manufacturing a filter according to any one of (1) to (14), comprising:

a step 1C of preparing a plurality of unfired pillar-shaped honeycomb structure segments having an outer peripheral side wall and partition walls disposed on an inner side of the outer peripheral side wall and partitioning a plurality of cells extending from a first end face to a second end face by forming and drying a green body;

a step 2C of impregnating each of the unfired pillar-shaped honeycomb structure segments with a slurry comprising aggregate particles and a solvent from an outermost peripheral portion of the outer peripheral side wall toward the inner side;

a step 3C of firing each of the unfired pillar-shaped honeycomb structure segments after the step 2C to obtain a plurality of pillar-shaped honeycomb structure segments made of porous ceramics in which an average porosity of the outer peripheral side wall is lower than that of the partition walls; and a step 4C of bonding via a bonding material side faces of the pillar-shaped honeycomb structure segments made of porous ceramics in which the average porosity of the outer peripheral side wall is lower than that of the partition walls.

(22) The method for manufacturing a filter according to (21), wherein the slurry comprises a pore forming material at a concentration of 0.5% by mass or less.

(23) The method for manufacturing a filter according to (21) or (22), wherein the step 2C comprises applying the slurry to an outermost peripheral portion of the outer peripheral side wall for each of the plurality of the unfired pillar-shaped honeycomb structure segments.

(24) The method for manufacturing a filter according to (21) or (22), wherein the step 2C comprises a step of entirely immersing each of the unfired pillar-shaped honeycomb structure segments in the slurry after sealing both of the end faces.

(25) A method for manufacturing a filter according to any one of (1) to (14), comprising:

a step 1D of preparing a plurality of unfired pillar-shaped honeycomb structure segments having an outer peripheral side wall and partition walls disposed on an inner side of the outer peripheral side wall and partitioning a plurality of cells extending from a first end face to a second end face by forming and drying a green body;

a step 2D of impregnating each of the unfired pillar-shaped honeycomb structure segments with a metallic Si from an outermost peripheral portion of the outer peripheral side wall toward the inner side;

a step 3D of firing each of the unfired pillar-shaped honeycomb structure segments after the step 2D to obtain a plurality of pillar-shaped honeycomb structure segments made of porous ceramics in which an average porosity of the outer peripheral side wall is lower than that of the partition walls; and a step 4D of bonding via a bonding material side faces of the pillar-shaped honeycomb structure segments made of porous ceramics in which the average porosity of the outer peripheral side wall is lower than that of the partition walls.

According to one embodiment of the filter of the present invention, it becomes difficult for the catalyst to be supported on the outer peripheral side wall and the bonding material of each segment, and on the other hand, the ratio of the catalyst supported on the partition walls that contributes to the improvement of the catalytic performance (for example, exhaust gas purification performance) increases. Thereby, in a filter in which side faces of a plurality of pillar-shaped honeycomb structure segments made of porous ceramics are bonded via a bonding material, a significant effect of improving catalytic performance while the amount of catalyst supported on the filter is the same can be obtained.

DETAILED DESCRIPTION OF THE INVENTION

Embodiments of the present invention will now be described in detail with reference to the figures. It should be understood that the present invention is not intended to be limited to the following embodiments, and any change, improvement or the like of the design may be appropriately added based on ordinary knowledge of those skilled in the art without departing from the spirit of the present invention. Also, the relationship of the thickness of each part in the figures is actually different from the actual ratio, and for the purpose of easy understanding the structures, thin parts are described in an enlarged manner, and are not shown by reflecting the actual thickness ratio as they are in actual products.

(1. Filter)

The filter according to the present invention can be used, for example, as a DPF (Diesel Particulate Filter) and a GPF (Gasoline Particulate Filter) for collecting soot attached to an exhaust gas line from a combustion device, typically an engine mounted on a vehicle. The filter according to the present invention can be installed, for example, in an exhaust pipe. A buffer mat for holding the filter in the exhaust pipe can be interposed between the inner surface of the exhaust pipe and the filter.

Figures 1A, 1B:
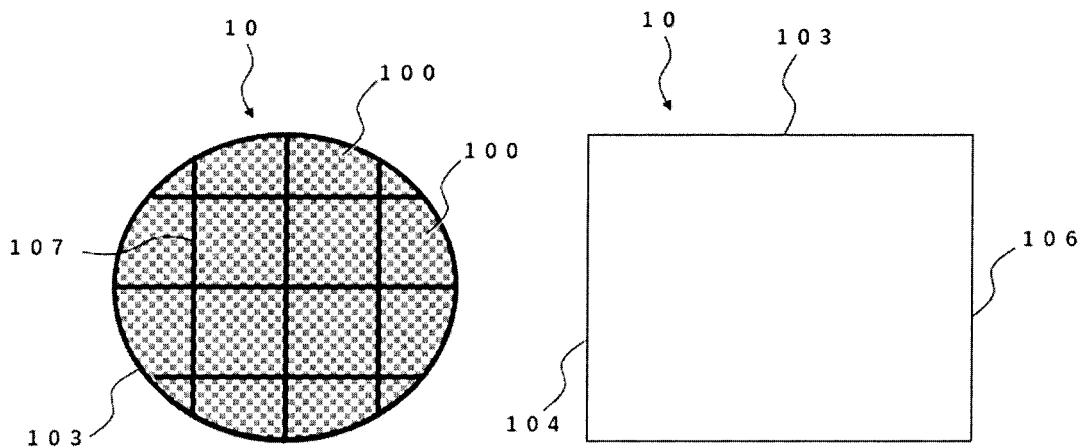
FIG. 1A is a schematic end face view of a filter according to one embodiment of the present invention.
FIG. 1B is a schematic side view of a filter according to one embodiment of the present invention.

FIG. 1A shows a schematic end face view and FIG. 1B shows a side view of a filter according to one embodiment of the present invention. The filter 10 comprises a first end face 104 serving as an exhaust gas inlet and a second end face 106 serving as an exhaust gas outlet. The exhaust gas flowing from the first end face 104 is purified while passing through the inside of the filter 10 and is discharged from the second end face 106. The filter 10 has a structure in which the side faces of a plurality of pillar-shaped honeycomb structure segments 100 are bonded together via a bonding material 107. By bonding a plurality of pillar-shaped honeycomb structure segments 100 to provide a segment bonded body, the thermal shock resistance can be improved. In addition, the filter 10 may have an outer peripheral wall 103 formed by grinding an outer peripheral portion into a desired shape (for example, a cylindrical shape), applying a coating material to an outer peripheral side face, and then drying and heat-treating the coating material.

Figure 2:
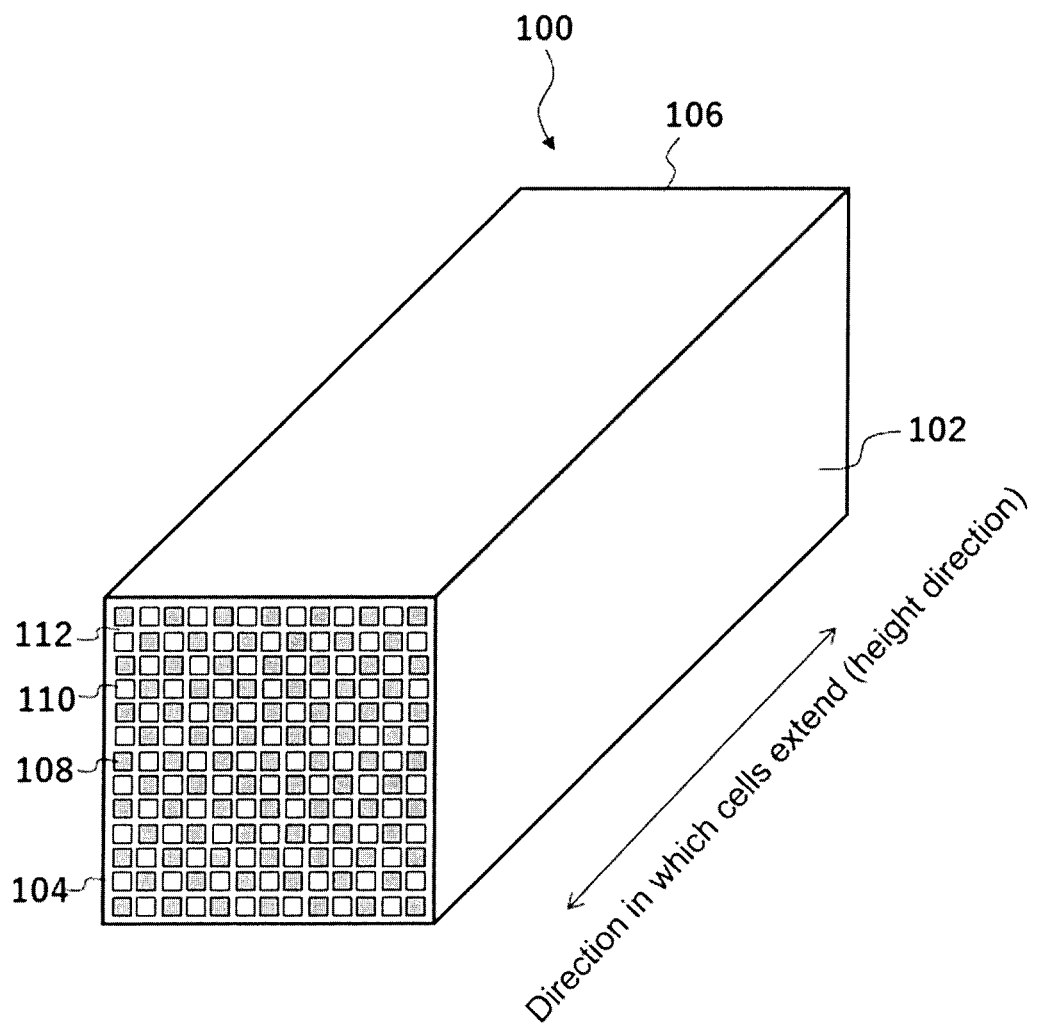
FIG. 2 is a schematic perspective view of a pillar-shaped honeycomb structure segment constituting a filter according to one embodiment of the present invention.
Figure 3:
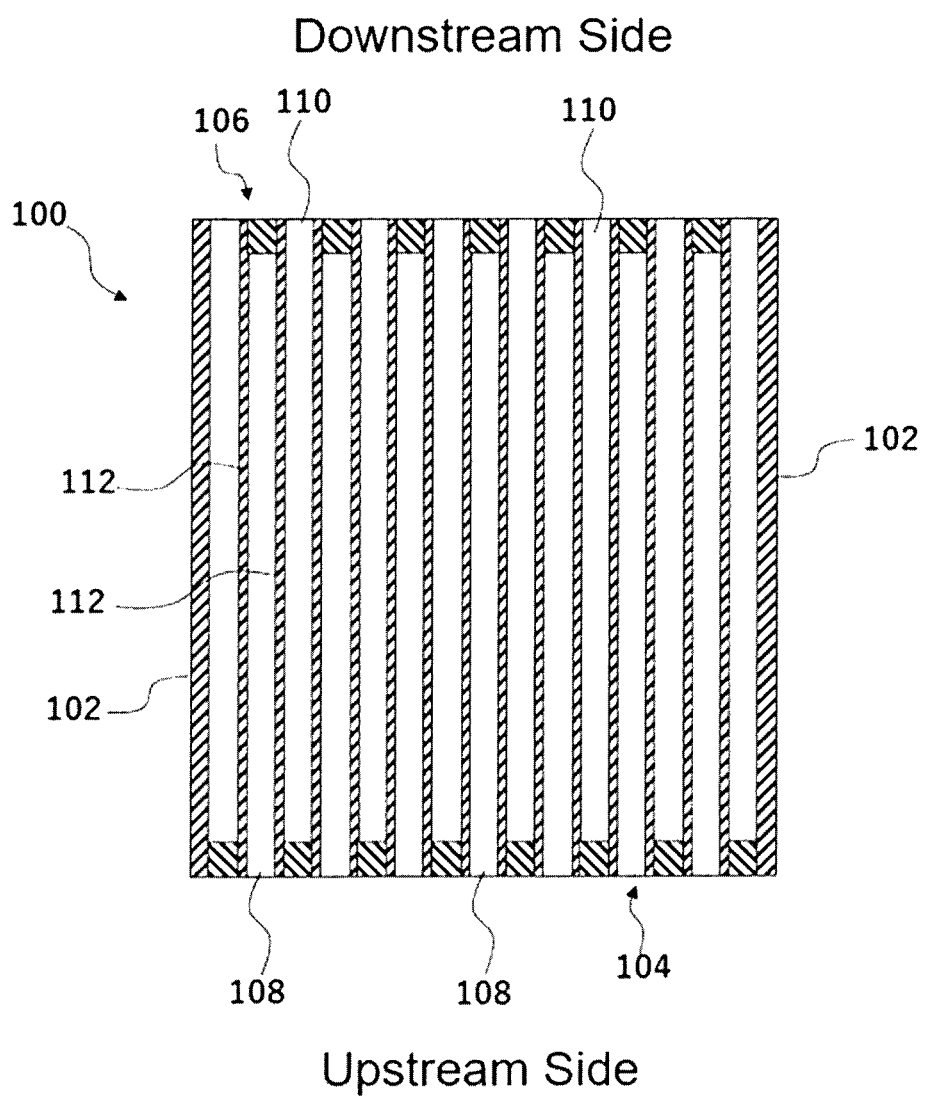
FIG. 3 is a schematic cross-sectional view of a pillar-shaped honeycomb structure segment constituting a filter according to one embodiment of the present invention, as observed from a cross section parallel to the direction in which the cells extend.

FIG. 2 shows a schematic perspective view of a pillar-shaped honeycomb structure segment 100 constituting a filter according to one embodiment of the present invention. FIG. 3 shows a schematic cross-sectional view of a pillar-shaped honeycomb structure segment 100 constituting a filter according to one embodiment of the present invention, as observed from a cross section parallel to the direction in which the cells extend.

The pillar-shaped honeycomb structure segment 100 comprises a honeycomb structure having an outer peripheral side wall 102 and porous partition walls 112 which are disposed on the inner side of the outer peripheral side wall 102 and partition a plurality of cells 108, 110 extending from the first end face 104 to the second end face 106. Each of the cells 108, 110 may penetrate from the first end face 104 to the second end face 106 by opening the first end face 104 and the second end face 106 together. However, in order to enhance the PM trapping performance, it is preferable that the pillar-shaped honeycomb structure 100 comprise a plurality of first cells 108 extending from the first end face 104 to the second end face 106, the first end face 104 being open and the second end face 106 being plugged, and a plurality of second cells 110 extending from the first end face 104 to the second end face 106, the first end face 104 being plugged and the second end face 106 being open. In this case, in the pillar-shaped honeycomb structure segment 100, the first cells 108 and the second cells 110 can be alternately arranged adjacent to each other with the partition walls 112 interposed therebetween such that both end faces have a checkered pattern.

When exhaust gas containing soot is supplied to the first end face 104 on the upstream side of the pillar-shaped honeycomb structure segment 100, the exhaust gas is introduced into the first cells 108 and proceeds downstream in the first cells 108. In the first cells 108, the second end face 106 on the downstream side is plugged, so that the exhaust gas flows through the porous partition walls 112 that partition the first cells 108 and the second cells 110 and flows into the second cells 110. Since soot cannot pass through the partition walls 112, it is collected and deposited in the first cells 108. After the soot is removed, the clean exhaust gas flows into the second cells 110, proceeds downstream in the second cells 110 and flows out of the second end face 106 on the downstream side.

The outer shape of the pillar-shaped honeycomb structure segment 100 is not particularly limited as long as it has a pillar-shape. For example, pillar shapes having polygonal end faces can be adopted. As polygons, quadrangles (rectangles, squares, and the like), hexagons, and the like, can be mentioned. In a typical embodiment, the outer shape of the pillar-shaped honeycomb structure segment 100 may be a quadrangular prism shape. Further, the size of the pillar-shaped honeycomb structure segment 100 can be such that it has, for example, an end face area of 100 to 3,600 mm$^2$, and typically 400 to 2,500 mm$^2$. The length (height) of the pillar-shaped honeycomb structure segment 100 in the extending direction of the cells can be, for example, 100 to 500 mm, and can be typically 120 to 400 mm.

The shape of the cells in a cross section orthogonal to the direction in which the first cells 108 and the second cells 110 extend (the height direction) is not limited, but is preferably a quadrangle, a hexagon, an octagon, or a combination thereof. Among these, squares and hexagons are preferred. By making the shape of cells like this, when the pillar-shaped honeycomb structure segment 100 is used as a particulate filter, the pressure loss when the exhaust gas flows is reduced, and the purification performance is improved.

The material of the pillar-shaped honeycomb structure segment 100 is not limited but may be porous ceramics. As to ceramics, cordierite, mullite, zirconium phosphate, aluminum titanate, silicon carbide, silicon-silicon carbide composite (for example, Si-bonded SiC), cordierite-silicon carbide composite, zirconia, spinel, indialite, sapphirine, corundum, titania, silicon nitride and the like can be mentioned. In addition, among these ceramics, one kind alone can be contained, and two or more kinds can be contained at the same time. As examples of other materials for the pillar-shaped honeycomb structure segment 100, porous sintered metal comprising an alloy component containing as a main component one or more selected from the group consisting of Fe, Cr, Mo, and Ni can be mentioned.

The average thickness of the partition walls 112 in each pillar-shaped honeycomb structure segment 100 is not limited, but is preferably 0.1 mm to 0.5 mm. By setting the average thickness of the partition walls 112 to preferably 0.1 mm or more, more preferably 0.2 mm or more, the strength of each pillar-shaped honeycomb structure segment 100 can be secured. Further, by setting the average thickness of the partition walls 112 to preferably 0.5 mm or less, more preferably 0.4 mm or less, pressure loss can be reduced when exhaust gas flows through each pillar-shaped honeycomb structure segment 100.

In the present invention, the thickness of a partition wall refers to a length of a line segment across the partition wall when the centers of gravity of adjacent cells are connected by this line segment in a cross section orthogonal to the direction in which the cells extend. The average thickness of the partition walls refers to the average value of the thickness of all the partitions walls in each pillar-shaped honeycomb structure segment.

In each pillar-shaped honeycomb structure segment, the average porosity of the partition walls 112 can be, for example, 30% to 80%, and is preferably 50% to 70%. By setting the average porosity of the partition walls within the above range, there is an advantage that the pressure loss can be suppressed while maintaining the strength of the manufactured pillar-shaped honeycomb structure segment. On the other hand, when the average porosity is lower than 30%, a problem of an increase in pressure loss occurs, and when the average porosity exceeds 80%, effects such as a decrease in strength and a decrease in thermal conductivity are caused. Here, the average porosity of the partition walls is an average value when a plurality of samples of the partition walls are sampled from the pillar-shaped honeycomb structure segment uniformly and the porosity of each sample is measured by image analysis. Specifically, for each sample, an SEM observation image is taken at a magnification of 300 times or more, and divided into three regions: a void portion, a catalyst portion (if present), and a base material portion. The area ratio of the area of the void portion+the catalyst portion (if present) to the area of the entire three regions is defined as the void percentage=porosity. That is, the porosity here is the porosity before supporting the catalyst.

In addition, the average pore diameter of the partition walls of each pillar-shaped honeycomb structure segment is not limited, but is preferably 7 μm to 40 μm, more preferably 7 μm to 30 μm, and even more preferably 7 μm to 23 μm, from the viewpoint of the balance among the ease of supporting the catalyst, the PM collection efficiency and the strength. Here, the average pore diameter of the partition walls is an average value when a plurality of samples of the partition walls are sampled from the pillar-shaped honeycomb structure segment uniformly and the average pore diameter of each sample is measured by a mercury intrusion method.

According to one embodiment, in each of the pillar-shaped honeycomb structure segments 100, an average porosity of the outer peripheral side wall 102 is lower than an average porosity of the partition walls 112. With this configuration, it becomes difficult for the catalyst to be supported on the outer peripheral side wall of each segment, and on the other hand, the proportion of the catalyst supported on the partition walls which contributes to the improvement of the catalytic performance can be increased. That is, since the ratio of the catalyst that is effectively used in the filter increases, the catalytic performance when the supported amount on the filter is the same is improved. In addition, conventionally, the bonding material sometimes contains Na as an impurity. In this case, there is a possibility that due to the diffusion of the Na into the inside of the segment, the catalyst component such as zeolite absorbs Na and thereby the catalytic performance is deteriorated. However, by reducing the average porosity of the outer peripheral side wall 102, it is expected that an effect of preventing Na from diffusing into the segment can be obtained. The ratio of the average porosity of the outer peripheral side wall 102 to the average porosity of the partition walls 112 is preferably 50% or less, more preferably 30% or less, and even more preferably 10% or less. The average porosity of the outer peripheral side wall is an average value when a plurality of samples covering the entire thickness of the outer peripheral side wall are sampled and the porosity of the entire outer peripheral side wall of each sample in the thickness direction is measured by image analysis. Specifically, for each sample, an SEM observation image is taken at a magnification of 300 times or more, and divided into three regions: a void portion, a catalyst portion (if present), and a base material portion. The area ratio of the area of the void portion+the catalyst portion (if present) to the area of the entire three regions is defined as the void percentage=porosity. That is, the porosity here is the porosity before supporting the catalyst.

The average porosity of the outer peripheral side wall 102 is preferably, for example, 8% to 35%. It is preferable that the average porosity of the outer peripheral side wall 102 be smaller because the ratio of the catalyst slurry filling the pores of the outer peripheral side wall 102 becomes smaller. In this respect, the average porosity of the outer peripheral side wall 102 is preferably 35% or less, more preferably 20% or less, and even more preferably 10% or less. However, when almost all the pores of the outer peripheral side wall 102 are filled, moisture absorption from the bonding material slurry used for bonding the segments becomes insufficient, so that there is a possibility that the bonding material slurry is not easily dried, or the bonding state between the bonding material 107 and the outer peripheral side wall 102 becomes weak. Therefore, the average porosity of the outer peripheral side wall 102 is preferably set to 3% or more, more preferably 5% or more, and even more preferably 8% or more. In addition, relating to this, a water-absorbing underlayer may be provided on the outer peripheral surface of the outer peripheral side wall 102 in order to enhance the water absorbability. As the underlayer, a porous ceramics layer mainly composed of silica, alumina or the like can be used.

In each of the pillar-shaped honeycomb structure segments 100, in order to make the average porosity of the outer peripheral side wall 102 lower than the average porosity of the partition walls 112, at least a part of the pores in the outer peripheral side wall 102 can be filled with a filler. The filler can comprise aggregate particles. From the viewpoint of preventing catalyst deterioration, the Na concentration in the filler is preferably 0.02% by mass or less.

For example, the aggregate particles can comprise one kind selected from the group consisting of alumina, silica, zirconia, silicon carbide, aluminum titanate, silicon nitride, cordierite, mullite, zirconium phosphate, titania, Fe—Cr—Al-based metal, nickel-based metal, and metallic Si as a main component, or comprise a mixture of two or more kinds selected from this group as a main component. Preferably, the aggregate particles can comprise one kind selected from the group consisting of alumina, silica, zirconia, silicon carbide, aluminum titanate, silicon nitride, and cordierite as a main component, or comprise a mixture of two or more kinds selected from this group as a main component. Among these, silicon carbide, which is a material having low affinity with Na, is more preferable. When the partition walls are made of a silicon-silicon carbide composite material (for example, Si-bonded SiC), it is preferable to use metallic Si as a main component of a binder between the aggregates since the bonding between the aggregates is possible by firing at a lower temperature, and the toughness of the material after firing is high and breakage is prevented. Here, the "main component" of the aggregate particles means a component that accounts for 50% by mass or more, preferably 70% by mass or more, more preferably 90% by mass or more of the aggregate particles. Further, as the aggregate particles, particles contained in a wash coat when catalyst component is supported on the honeycomb structure, such as γ-alumina, ceria, zirconia, ceria-based composite oxide, and zirconia-based composite oxide can also be used.

The filler preferably comprises a binder. The binder has a function of binding the aggregate particles to the inner surface of the pores on the outer peripheral side wall. Examples of the binder that can be suitably used include, but are not limited to, colloidal sols such as silica sol and alumina sol, and layered compounds that swell and exhibit binding properties. In the present specification, when an SEM observation image is taken at a magnification of 300 times or more, particles having a particle diameter (equivalent circle diameter) exceeding 0.3 μm are regarded as aggregate particles, and particles having a particle diameter (equivalent circle diameter) of 0.3 μm or less are regarded as a binder.

In order to minimize the amount of catalyst that is supported in the outer peripheral side wall 102 and cannot be used effectively, the average thickness of the outer peripheral side wall 102 is preferably 1.8 times or less, more preferably 1.5 times or less, even more preferably 1.2 times or less, and even more preferably 1.0 times or less as thick as the average thickness of the partition walls 112. In addition, from the viewpoint of ensuring the strength of the pillar-shaped honeycomb structure segment 100, the average thickness of the outer peripheral side wall 102 is preferably 0.5 times or more, and more preferably 0.8 times or more as thick as the average thickness of the partition walls 112. In particular, in each pillar-shaped honeycomb structure segment 100, if the average thickness of the outer peripheral side wall 102 is 0.5 times or more and 1.2 times or less as thick as the average thickness of the partition walls 112, the balance between the effect of reducing the amount of catalyst supported on the outer peripheral side wall and the bonding material, and the strength of the pillar-shaped honeycomb structure segment becomes improved. In the present invention, the average thickness of the outer peripheral side wall refers to an average value of the thicknesses of arbitrary plural portions of the outer peripheral side wall which are uniformly measured in a cross section orthogonal to the direction in which the cells extend.

According to one embodiment, in each of the pillar-shaped honeycomb structure segments 100, the outer peripheral side wall 102 is such that the average porosity of the region having a thickness of 20% or more of the outer peripheral side wall 102 inward from the outermost peripheral portion of the outer peripheral side wall 102 is lower than the average porosity of the partition walls 112. With this configuration, the ratio of the catalyst slurry filled in the pores of the outer peripheral side wall 102 can be effectively reduced. The ratio of the average porosity of the region of the outer peripheral side wall 102 to the average porosity of the partition walls 112 is preferably 70% or less, more preferably 50% (half) or less, and even more preferably 25% or less. The average porosity of the region having a thickness of 20% or more of the outer peripheral side wall is an average value when a plurality of samples including the region are sampled and the porosity of the region of each sample is measured by image analysis. Specifically, for each sample, an SEM observation image is taken at a magnification of 300 times or more, and divided into three regions: a void portion, a catalyst portion (if present), and a base material portion. The area ratio of the area of the void portion+the catalyst portion (if present) to the area of the entire three regions is defined as the void percentage=porosity. That is, the porosity here is the porosity before supporting the catalyst.

According to one embodiment, in each of the pillar-shaped honeycomb structure segments 100, the outer peripheral side wall 102 is such that, the average porosity of the region having a thickness of 50% of the outer peripheral side wall 102 outward from the innermost peripheral portion of the outer peripheral side wall 102 (hereinafter also referred to as the "inner peripheral side average porosity of the outer peripheral side wall") is higher than the average porosity of the region having a thickness of 50% of the outer peripheral side wall 102 inward from the outermost peripheral portion of the outer peripheral side wall 102 (hereinafter also referred to as the "outer peripheral side average porosity of the outer peripheral side wall"). Since the inner peripheral side average porosity of the outer peripheral side wall is higher than the outer peripheral side average porosity of the outer peripheral side wall, it is possible to prevent a region having a low porosity from reaching the partition walls 112 beyond the outer peripheral side wall. When the porosity of the partition walls 112 is low, the catalyst is not easily supported on the partition walls 112, so that there is a problem that the partition walls 112 are not effectively used for purifying the exhaust gas. The ratio of the outer peripheral side average porosity of the outer peripheral side wall to the inner peripheral side average porosity of the outer peripheral side wall is preferably 35% or less, more preferably 20% or less, and even more preferably 10% or less. In the measuring method of the outer peripheral side average porosity of the outer peripheral side wall and the inner peripheral side average porosity of the outer peripheral side wall, a plurality of samples including the corresponding region are sampled and the porosity of the region of each sample is measured by image analysis and the average is calculated, respectively. The specific procedure is the same as the method for measuring the average porosity of the region having a thickness of 20% or more of the outer peripheral side wall.

According to one embodiment, in each of the pillar-shaped honeycomb structure segments 100, a difference between the average porosity of the region having a thickness of 10% of the outer peripheral side wall 102 outward from the innermost peripheral portion of the outer peripheral side wall 102 and the average porosity of the partition walls 112 is within 5%. The difference in the average porosity is preferably within 3%, more preferably within 1%. The fact that the average porosity of the region near the innermost peripheral portion of the outer peripheral side wall 102 is at the similar level to the average porosity of the partition walls 112 means that the region having a low porosity does not deeply penetrate into the partition walls 112 beyond the outer peripheral side wall 102, preferably means that the region having a low porosity does not reach the partition walls 112 beyond the outer peripheral side wall 102. In addition, normally, the average porosity of the region with a thickness of 10% of the outer peripheral side wall 102 outward from the innermost peripheral portion of the outer peripheral side wall 102 is lower than or equal to the average porosity of the partition walls 112.

(2. Method for Manufacturing Filter)

The first embodiment of the method for manufacturing a filter according to the present invention comprises:

- a step 1A of preparing a plurality of pillar-shaped honeycomb structure segments made of porous ceramics having an outer peripheral side wall and partition walls disposed on an inner side of the outer peripheral side wall and partitioning a plurality of cells extending from a first end face to a second end face;
- a step 2A of impregnating each of the pillar-shaped honeycomb structure segments made of porous ceramics with a slurry comprising aggregate particles and a solvent from an outermost peripheral portion of the outer peripheral side wall toward the inner side, and thereafter firing to obtain a plurality of pillar-shaped honeycomb structure segments made of porous ceramics in which an average porosity of the outer peripheral side wall is lower than that of the partition walls; and
- a step 3A of bonding via a bonding material side faces of the plurality of the pillar-shaped honeycomb structure segments made of porous ceramics in which the average porosity of the outer peripheral side wall is lower than that of the partition walls.

In the step 1A, a plurality of pillar-shaped honeycomb structure segments made of porous ceramics having an outer peripheral side wall and partition walls disposed on an inner side of the outer peripheral side wall and partitioning a plurality of cells extending from a first end face to a second end face are prepared. The pillar-shaped honeycomb structure segment made of porous ceramics can be manufactured according to a publicly known method for manufacturing a honeycomb structure, and the procedure is exemplified below. First, a green body containing a predetermined ceramics raw material, a dispersion medium, a pore forming material and a binder is prepared. Next, the green body is subjected to extrusion molding to form a honeycomb formed body. At the time of extrusion molding, a die having a desired overall shape, cell shape, partition wall thickness, cell density, and the like can be used. The method of plugging the end face of the honeycomb formed body is not particularly limited, and a well-known method of filling with a plugging slurry the cell openings on the end face on which a predetermined mask is attached may be employed. Thereafter, by firing the dried honeycomb formed body, a pillar-shaped honeycomb structure segment can be manufactured. The firing conditions may be any publicly known conditions depending on the material of the segment, and are not particularly limited.

In the step 2A, for each of the pillar-shaped honeycomb structure segments made of porous ceramics prepared in the step 1A, a slurry containing aggregate particles and a solvent is impregnated from the outermost peripheral portion of the outer peripheral side wall toward the inner side, and then fired to obtain a plurality of pillar-shaped honeycomb structure segments made of porous ceramics in which an average porosity of the outer peripheral side wall is lower than that of the partition walls. Preferably, the slurry contains a binder.

The average particle diameter of the aggregate particles is preferably 2% to 60%, more preferably 10% to 50%, even more preferably 30% to 40% of the average pore diameter of the outer peripheral side wall before impregnation with the slurry. When the average particle diameter of the aggregate particles is less than 2% of the average pore diameter of the outer peripheral side wall before impregnation with the slurry, the particles to be filled in the pores of the outer peripheral side wall are too small with respect to the pore diameter, so there is a possibility that the pores cannot be sufficiently filled. That is, they may not be held in the pores and may pass through. On the other hand, if the average particle diameter of the aggregate particles exceeds 60% of the average pore diameter of the outer peripheral side wall before impregnation with the slurry, the particles to be filled in the pores of the outer peripheral side wall are too large with respect to the pore diameter, so there is a possibility that the particles cannot be filled in the pores (do not enter the pores). The average particle diameter of the aggregate particles refers to a median diameter (D50) in a volume-based cumulative particle diameter distribution measured by a laser diffraction method.

Besides, preferred embodiments of the aggregate particles and the binder in the slurry are as described above. As the solvent in the slurry, it is preferable to use water, alcohol, or a mixture of both as a main component. Here, the "main component" of the solvent refers to a component that accounts for 50% by mass or more, preferably 70% by mass or more, more preferably 90% by mass or more of the solvent.

From the viewpoint of reducing the average porosity of the outer peripheral side wall, the concentration of the pore forming material in the slurry is preferably 0.5% by mass or less, more preferably 0.2% by mass or less, and ever more preferably 0% by mass.

Further, the slurry may appropriately contain a dispersant and/or an antifoaming agent.

As a method of impregnating the slurry containing the aggregate particles, the binder and the solvent inward from the outermost peripheral portion of the outer peripheral side wall, for example, a method of applying the slurry to the outermost peripheral portion of the outer peripheral side wall for each of the pillar-shaped honeycomb structure segments can be mentioned. In addition, a method of sealing both end faces of each of the pillar-shaped honeycomb structure segments and then entirely impregnating it with the slurry can be employed. As a method of sealing both end faces, the same method as a method of attaching a bonding material adhesion preventing film described below to both end faces can be mentioned.

In the firing after the slurry impregnation, it is preferable to perform a heat treatment of the slurry at a temperature and for a time such that the aggregate particles can be fixed to the pores in the outer peripheral side wall. For example, when the slurry contains aggregate particles having the same composition as the partition walls, a heat treatment under the similar conditions to the firing conditions of the partition walls is required to impart a bonding property. Further, when a binder such as colloidal silica which develops strength at 700 to 800° C. is combined, heat treatment at a low temperature becomes possible.

The amount of decrease in the average porosity of the outer peripheral side wall with respect to the average porosity of the partition walls, and the amount of decrease in the average pore diameter of the outer peripheral side wall with respect to the average pore diameter of the partition walls can be adjusted by the average particle diameter and content of the aggregate particles contained in the slurry and the number of times of impregnation with the slurry. Further, it is preferable to control the particles in the slurry filled in the pores of the outer peripheral side wall by the impregnation operation so as to remain only in the outer peripheral wall and not to reach the partition walls partitioning the cells. The control can be adjusted by the viscosity of the slurry, the impregnation time in the slurry, the amount of the slurry applied, and the like.

In the step 3A, side faces of the pillar-shaped honeycomb structure segments made of porous ceramics in which the average porosity of the outer peripheral side wall is lower than that of the partition walls are bonded via a bonding material to obtain a segment bonded body. The segment bonded body can be manufactured, for example, by the following procedure. A bonding material is applied to the bonding surfaces (side faces) with bonding material adhesion preventing films adhered to the both end faces of each pillar-shaped honeycomb structure segment. Next, these segments are arranged adjacently so that the side faces of the segments face each other, and the adjacent segments are press-bonded and then dried by heating. In this way, a segment bonded body in which the side faces of the adjacent segments are bonded by the bonding material is produced.

The material for the bonding material adhesion preventing film is not particularly limited, but for example, a synthetic resin such as polypropylene (PP), polyethylene terephthalate (PET), polyimide, or Teflon (registered trademark) can be suitably used. In addition, preferably, the film has an adhesive layer, and the material of the adhesive layer is preferably an acrylic resin, a rubber resin (for example, a rubber mainly composed of natural rubber or synthetic rubber), or a silicone resin.

As the bonding material, for example, a material prepared by mixing a ceramics powder, a dispersion medium (for example, water, and the like), and, if necessary, additives such as a binder, a deflocculant, and a foamed resin can be used. Ceramics include cordierite, mullite, zirconium phosphate, aluminum titanate, silicon carbide, silicon-silicon carbide composite (eg, Si-bonded SiC), cordierite-silicon carbide composite, zirconia, spinel, indialite, sapphirine, corundum, titania, silicon nitride, and the like, and more preferably is the same material as the pillar-shaped honeycomb structure. Examples of the binder include polyvinyl alcohol and methyl cellulose and the like.

The second embodiment of the method for manufacturing a filter according to the present invention comprises:

a step 1B of preparing a plurality of pillar-shaped honeycomb structure segments made of porous ceramics having an outer peripheral side wall and partition walls disposed on an inner side of the outer peripheral side wall and partitioning a plurality of cells extending from a first end face to a second end face;

a step 2B of impregnating each of the pillar-shaped honeycomb structure segments made of porous ceramics with a metallic Si from an outermost peripheral portion of the outer peripheral side wall toward the inner side, and thereafter firing to obtain a plurality of pillar-shaped honeycomb structure segments made of porous ceramics in which an average porosity of the outer peripheral side wall is lower than that of the partition walls; and a step 3B of bonding via a bonding material side faces of the pillar-shaped honeycomb structure segments made of porous ceramics in which the average porosity of the outer peripheral side wall is lower than that of the partition walls.

The step 1B is the same as the step 1A, so the detailed description thereof will be omitted. However, in the present embodiment, it is preferable that the pillar-shaped honeycomb structure segment prepared in the step 1B is made of a silicon-silicon carbide composite material (for example, Si-bonded SiC).

In the step 2B, for each of the pillar-shaped honeycomb structure segments made of porous ceramics, a metallic Si is impregnated from an outermost peripheral portion of the outer peripheral side wall toward the inner side, and thereafter firing to obtain a plurality of pillar-shaped honeycomb structure segments made of porous ceramics in which an average porosity of the outer peripheral side wall is lower than that of the partition walls. As a method of impregnating metallic Si from the outermost peripheral portion of the outer peripheral side wall toward the inner side, for example, a method in which a metallic Si flake is placed on or wound around the outer peripheral surface of a porous segment fired body, and the temperature is increased to a temperature equal to or higher than the melting point of the metallic Si by heating the whole body for utilizing the capillary phenomenon by which the melted metallic Si is absorbed into the pores, can be mentioned.

The step 3B is the same as the step 3A, and the detailed description thereof will be omitted.

The third embodiment of the method for manufacturing a filter according to the present invention comprises:

a step 1C of preparing a plurality of unfired pillar-shaped honeycomb structure segments having an outer peripheral side wall and partition walls disposed on an inner side of the outer peripheral side wall and partitioning a plurality of cells extending from a first end face to a second end face by forming and drying a green body;

a step 2C of impregnating each of the unfired pillar-shaped honeycomb structure segments with a slurry comprising aggregate particles and a solvent from an outermost peripheral portion of the outer peripheral side wall toward the inner side;

a step 3C of firing each of the unfired pillar-shaped honeycomb structure segments after the step 2C to obtain a plurality of pillar-shaped honeycomb structure segments made of porous ceramics in which an average porosity of the outer peripheral side wall is lower than that of the partition walls; and a step 4C of bonding via a bonding material side faces of the pillar-shaped honeycomb structure segments made of porous ceramics in which the average porosity of the outer peripheral side wall is lower than that of the partition walls.

In the step 1C, a plurality of unfired pillar-shaped honeycomb structure segments having an outer peripheral side wall and partition walls disposed on an inner side of the outer peripheral side wall and partitioning a plurality of cells extending from a first end face to a second end face are prepared by forming and drying a green body. The unfired pillar-shaped honeycomb structure segment can be manufactured according to a publicly known method for manufacturing a honeycomb structure, and the procedure is exemplified below. First, a green body containing a predetermined ceramics raw material, a dispersion medium, a pore forming material and a binder is prepared. Next, the green body is subjected to extrusion molding to form a honeycomb formed body. At the time of extrusion molding, a die having a desired overall shape, cell shape, partition wall thickness, cell density, and the like can be used. The method of plugging the end face of the honeycomb formed body is not particularly limited, and a well-known method of filling with a plugging slurry the cell openings on the end face on which a predetermined mask is attached may be employed.

In the step 2C, for each of the unfired pillar-shaped honeycomb structure segments prepared in the step 1C, a slurry comprising aggregate particles and a solvent is impregnated from the outermost peripheral portion of the outer peripheral side wall toward the inner side. Preferably, the slurry contains a binder. The step 2C may be performed in accordance with the step 2A, and the detailed description thereof will be omitted.

In the step 3C, each of the unfired pillar-shaped honeycomb structure segments after the step 2C is fired to obtain a plurality of pillar-shaped honeycomb structure segments made of porous ceramics in which an average porosity of the outer peripheral side wall is lower than that of the partition walls. In the present embodiment, the partition walls, the outer peripheral side wall, and the slurry impregnated into the outer peripheral side wall are simultaneously fired. Therefore, the aggregate particles used for the slurry may be the same ceramics raw material as the partition walls. The firing conditions may be any publicly known conditions depending on the material of the segment, and are not particularly limited.

The step 4C is the same as the step 3A, so the detailed description thereof will be omitted.

The fourth embodiment of the method for manufacturing a filter according to the present invention comprises:
- a step 1D of preparing a plurality of unfired pillar-shaped honeycomb structure segments having an outer peripheral side wall and partition walls disposed on an inner side of the outer peripheral side wall and partitioning a plurality of cells extending from a first end face to a second end face by forming and drying a green body;
- a step 2D of impregnating each of the unfired pillar-shaped honeycomb structure segments with a metallic Si from an outermost peripheral portion of the outer peripheral side wall toward the inner side;
- a step 3D of firing each of the unfired pillar-shaped honeycomb structure segments after the step 2D to obtain a plurality of pillar-shaped honeycomb structure segments made of porous ceramics in which an average porosity of the outer peripheral side wall is lower than that of the partition walls; and
- a step 4D of bonding via a bonding material side faces of the pillar-shaped honeycomb structure segments made of porous ceramics in which the average porosity of the outer peripheral side wall is lower than that of the partition walls.

The step 1D is the same as the step 10, so the detailed description thereof will be omitted. However, in the present embodiment, it is preferred the unfired pillar-shaped honeycomb structure segments prepared in the step 1D comprise a forming raw material for obtaining a silicon-silicon carbide composite material (for example, Si-bonded SiC), that is, metallic Si particles and silicon carbide particles.

In the step 2D, for each of the unfired pillar-shaped honeycomb structure segments, a metallic Si is impregnated from the outermost peripheral portion of the outer peripheral side wall toward the inner side, followed by a drying step. As a method of impregnating metallic Si from the outermost peripheral portion of the outer peripheral side wall toward the inner side, for example, a method in which a metallic Si flake is placed on or wound around the outer peripheral surface of a porous segment fired body, and the temperature is increased to a temperature equal to or higher than the melting point of the metallic Si by heating the whole body for utilizing the capillary phenomenon by which the melted metallic Si is absorbed into the pores, can be mentioned.

The step 3D is the same as the step 3C and will not be described in detail.

The step 4D is the same as the step 3A and will not be described in detail.

With respect to the segment bonded body manufactured by the above procedure, the outer peripheral portion may be ground to a desired shape (for example, a cylindrical shape), and a coating material may be applied to the outer peripheral side face, and then by drying and heating treatment, an outer peripheral wall can be formed. The coating material is not particularly limited, and a publicly known outer periphery coating material can be used. As the outer peripheral coating material, for example, a slurry made by adding an additive such as an organic binder, a foamed resin, a dispersant, and the like, and water to an inorganic material such as inorganic fiber, colloidal silica, clay, ceramic particles, and the like and kneading them can be mentioned here. In addition, the method for applying the outer peripheral coating material is not particularly limited, and a publicly known method can be used.

An appropriate catalyst may be supported on the filter depending on the application. As a method of supporting the catalyst on the filter, for example, a method in which a catalyst slurry is introduced into the cells by a conventionally publicly known suction method or the like, and is attached to the surface or pores of the partition walls, and then subjected to a high-temperature treatment so that the catalyst contained in the catalyst slurry are baked and supported on the partition walls, can be mentioned.

Examples of the catalyst include, but are not limited to, an oxidation catalyst (DOC) for oxidizing and burning hydrocarbons (HC) and carbon monoxide (CO) to increase the exhaust gas temperature, a PM combustion catalyst to assist combustion of PM such as soot, SCR catalysts and NSR catalysts for removing nitrogen oxides (NOx), and three-way catalysts capable of simultaneously removing hydrocarbons (HC), carbon monoxide (CO) and nitrogen oxides (NOx). Catalysts may appropriately contain, for example, noble metals (Pt, Pd, Rh, and the like), alkali metals (Li, Na, K, Cs, and the like), alkaline earth metals (Ca, Ba, Sr, and the like), rare earths (Ce, Sm, Gd, Nd, Y, Zr, Ca, La, Pr, and the like) and transition metals (Mn, Fe, Co, Ni, Cu, Zn, Sc, Ti, V, Cr, and the like) and the like.

Particularly, in a DPF for a passenger car, an SCR catalyst such as a Cu-substituted zeolite or an Fe-substituted zeolite is supported on the DPF in order to simultaneously have soot collection and NOx purification functions. In this case, it is possible to purify NOx with ammonia obtained by decomposing urea on the vehicle. Since zeolite often contains Na as an impurity component, when a catalyst containing zeolite is supported on a filter, the effect of applying the present invention is particularly high.

In the case of DPF and GPF, in addition to the SCR catalyst, there is a case where a catalyst containing a noble metal such as platinum for oxidizing and burning carbon monoxide (CO), hydrocarbons (HC) and soot is supported in the pores of the partition walls and on the partition walls surface; In addition, there is a case where a three-way catalyst containing a noble metal such as platinum, palladium, and rhodium for reducing CO, HC, and NOx is supported in the pores of the partition walls and on the partition walls surface. According to one embodiment of the present invention, also in these cases, the amount of the catalyst and the amount of the noble metal that is supported on the outer peripheral side wall of the honeycomb structure segment and cannot be effectively used can be reduced, so that the purification efficiency can be improved, and the amount of catalyst used and the amount of noble metal used can be reduced, and cost reduction can be achieved. In addition, the cost can be reduced by reducing the material amount of the outer peripheral side wall of the honeycomb structure segment. In addition, there is a secondary effect that the weight reduction and heat capacity reduction of the honeycomb structure segment are obtained so that the light-off performance is improved. There is also a secondary effect that the rigidity of the honeycomb structure segment reduces so that the forced strain applied to the bonding material due to the temperature distribution during use is reduced, preventing the occurrence of cracks in the bonding material.

EXAMPLES

Hereinafter, examples for better understanding the present invention and its advantages will be described, but the present invention is not limited to the examples.

Example 1

SiC powder and metallic Si powder were mixed at a mass ratio of SiC powder:metallic Si powder=80:20, and a pore forming material, an organic binder, a surfactant, and water were added thereto to obtain a plastic green body. The green body was extrusion molded and dried to obtain a pillar-shaped honeycomb formed body having an outer peripheral side wall and partition walls partitioning a plurality of cells extending from a first end face to a second end face. Plugging portions were formed at one end of each cell so that both end faces of the pillar-shaped honeycomb formed body had a checkered pattern. That is, plugging portions were formed such that adjacent cells were plugged at opposite ends. The same material as that of the pillar-shaped honeycomb formed body was used as the material of the plugging portions. After the plugging portions were formed and dried in this manner, the pillar-shaped honeycomb formed body was degreased at about 400° C. in the air atmosphere, and further fired at about 1450° C. in an Ar atmosphere to bond the SiC particles with the Si in the formed body and thereby to obtain a rectangular parallelepiped honeycomb structure segment having the following specifications.
(Honeycomb Structure Segment Specification)
Outer shape: A rectangular parallelepiped with end faces of 42 mm square on each side and a height (length in the direction in which the cells extend) of 152 mm
Average porosity of partition walls: 63%
Average pore diameter of partition walls: 20 μm
Average thickness of partition walls: 12 mil (305 μm)
Cell cross sectional shape: square
Cell density: about 46.5 cells/cm² (300 cells/in²)
Average thickness of outer peripheral side wall: described in Table 1-1
Average pore diameter of outer peripheral side wall: 20 μm Next, 150 parts by mass of colloidal silica (water dispersion having a solid content of 40%) having an average particle diameter (referred to as a median diameter (D50) in a volume-based cumulative particle diameter distribution measured by a laser diffraction method) of 300 nm or less and 200 parts by mass of water were added to 150 parts by mass of SiC particles having an average particle diameter shown in Table 1-1, and the mixture was thoroughly stirred to prepare a slurry having the viscosity shown in Table 1. In preparing the slurry, a dispersant and an antifoaming agent were appropriately added, but no pore forming material was added. The viscosity of the slurry was measured at 20° C. using a Brookfield rotational viscometer. Then, both end faces of the honeycomb structure segment were sealed with a resin film, and the whole was immersed in the slurry thus obtained for the contact time shown in Table 1-1 (in the case of immersion, from the start of contact with the slurry to the start of blowing off). And then, the excess slurry was removed by air blowing. Next, after the slurry impregnated in the outer peripheral side wall of the honeycomb structure segment was dried, firing was performed at 700° C. in the air atmosphere to form a low porosity region in the outer peripheral side wall of the honeycomb structure segment.

Subsequently, to a mixture of SiC powder, aluminosilicate fiber, silica sol aqueous solution and clay, water was further added and the mixture was kneaded for 30 minutes using a mixer to obtain a paste-like bonding material. This bonding material was applied to the outer peripheral side face of the honeycomb structure segment so as to have a thickness of about 1 mm to form a bonding material layer, and another honeycomb structure segment prepared in the same procedure as above was placed thereon. The process was repeated to produce a segment laminate including a total of 16 honeycomb structured segments in a combination of 4 segments (vertical direction)×4 segments (horizontal direction). Then, the whole was bonded by applying pressure from the outside as appropriate, and then dried at 120° C. for 2 hours to obtain a segment bonded body. After grinding the outer periphery of the segment bonded body so that the outer shape of the segment bonded body became a cylindrical shape, a coating material having the same composition as the bonding material was applied to the processed surface to re-form the outer peripheral wall. Drying and curing were then performed at 700° C. for 2 hours in the air atmosphere to obtain the filter of Example 1.

Example 2

The filter of Example 2 was obtained by performing the same method as in Example 1 except that, instead of immersing in the slurry the honeycomb structure segment with both end faces sealed, a method of applying the slurry to the entire outer peripheral side face of the honeycomb structure segment was employed, and the viscosity of the slurry and the slurry contact time (in the case of application, the time from the end of coating to the start of blowing) were changed to the conditions shown in Table 1-1.

Example 3

The same pillar-shaped honeycomb formed bodies with plugging portions as in Example 1 were prepared. Next, to 20 parts by mass of a mixture in which the SiC powder and metallic Si powder used in producing the pillar-shaped honeycomb formed bodies were mixed at a mass ratio of SiC powder:metallic Si powder=80:20, 80 parts by mass of water was added, and after stirring well, a slurry having the viscosity shown in Table 1-1 was prepared. In preparing the slurry, a dispersant and an antifoaming agent were appropriately added, but no pore forming material was added. The obtained slurry was applied to the entire outer peripheral side face of the pillar-shaped honeycomb formed bodies. After drying the applied slurry, the whole was degreased at 400° C. in the air atmosphere, and was further fired at 1430° C. in the Ar atmosphere to obtain honeycomb structure segments having an outer peripheral side wall with a low porosity region. Thereafter, using the obtained honeycomb structure segments, the same method as in Example 1 was performed to prepare a segment bonded body, and thus the filter of Example 3 was obtained.

Example 4

The filter of Example 4 was obtained by performing the same method as in Example 2 except that the average thickness of the outer peripheral side wall of the honeycomb structure segment was changed to the value shown in Table 1-1.

Example 5

After mixing 20 parts by mass of alumina particles having an average particle diameter shown in Table 1-1 and 80 parts by mass of water, the mixture was well stirred to prepare a slurry having a viscosity shown in Table 1-1. In preparing the slurry, a dispersant and an antifoaming agent were appropriately added, but no pore forming material was added. Further, the same honeycomb structure segments as in Example 1 were prepared except that the average thickness of the outer peripheral side wall of the honeycomb structure segment was changed to a value shown in Table 1-1. Next, the same method as in Example 2 was performed to obtain the filter of Example 5, except that the slurry and the honeycomb structure segments thus obtained were used and the slurry contact time was changed to the conditions shown in Table 1-1.

Example 6

The filter of Example 6 was obtained by performing the same method as in Example 5 except that the average thickness of the outer peripheral side wall of the honeycomb structure segment was changed to the value shown in Table 1-1 and the viscosity of the slurry and the slurry contact time were changed to the conditions shown in Table 1-1.

Example 7

Molding and firing were performed in the same manner as in Example 1 to obtain honeycomb structure segments. A metallic Si foil with a thickness of 200 μm was adhered to the entire outer peripheral side face of the honeycomb structure segments, and refired at 1430° C. in an Ar atmosphere to impregnate the metallic Si into the pores in the outer peripheral side wall of the honeycomb structure segments. As a result, honeycomb structure segments having an outer peripheral side wall with a low porosity region were obtained. Thereafter, using the obtained honeycomb structure segments, the same method as in Example 1 was performed to prepare a segment bonded body, and the filter of Example 7 was thus obtained.

Examples 8 to 10, Comparative Example 1 to 3

The filters of Examples 8 to 10 and Comparative Example 1 to 3 were obtained by performing the same method as in Example 1 except that the average thickness of the outer peripheral side wall of the honeycomb structure segment was changed to the value shown in Table 1-1 and the step of forming a low porosity region in the outer peripheral side wall of the honeycomb structure segment was not performed.

(Characteristic Evaluation)

The following average porosity of the filters according to the Examples and the Comparative Examples prepared by the above-described procedure was measured according to the method described above. The results are shown in Table 1-2.

A: Average porosity of the entire outer peripheral side wall

B: Average porosity of a region with a thickness of 20% of the outer peripheral side wall inward from the outermost peripheral portion of the outer peripheral side wall C: Average porosity of a region with a thickness of 10% of the outer peripheral side wall outward from the innermost peripheral portion of the outer peripheral side wall D: Average porosity of the region with a thickness of 50% of the outer peripheral side wall inward from the outermost peripheral portion of the outer peripheral side wall (average porosity of outer peripheral side of the outer peripheral side wall)

E: Average porosity of the region with a thickness of 50% of the outer peripheral side wall outward from the innermost peripheral portion of the outer peripheral side wall (average porosity of inner peripheral side of the outer peripheral side wall)

The ratio (%) of the pore volume in the outer peripheral side wall of the honeycomb structure segment to the total pore volume of the honeycomb structure segment was measured by SEM image analysis of the filters according to the Examples and the Comparative Examples prepared by the above procedure. The results are shown in Table 1-2.

Then, catalyst was supported on the filters according to the Examples and the Comparative Examples prepared by the above-described procedure, and a catalyst-supporting filter was prepared. As the catalyst, an SCR catalyst was used. The method for supporting the catalyst on the filter was a method in which the catalyst solution was wash-coated on the filter, and then heat treated at 550° C. for baking. Then, for the catalyst-supporting filter, the ratio (%) of the amount of catalyst in the outer peripheral side wall of the honeycomb structure segment to the entire catalyst in the honeycomb structure segment was measured by SEM image analysis.

The results are shown in Table 1-2.

The evaluation criteria were as follows.

○ (good): the ratio is less than 4.0%
Δ (passed): the ratio was 4.0% or more and less than 5.0%
X (not passed): the ratio is 5.0% or more With respect to the filters according to the Examples and the Comparative Examples manufactured by the above procedure, strength evaluation was performed in accordance with a hydrostatic pressure test (enclosing the filter in a rubber container and applying hydrostatic pressure in water).

The evaluation criteria were as follows. The results are shown in Table 1-2.

○: Burst pressure of 1.5 MPa or more
x: burst pressure less than 1.5 MPa

TABLE 1-1

| | Honeycomb structure segment material | Aggregate of filler | Average particle diameter of aggregate of filler (μm) | Binders in filler | Slurry viscosity mPa·sec | Filling method | Contact time with slurry (Sec) | Average outer peripheral side wall thickness (mm) | Average outer peripheral side wall thickness/average partition walls thickness |
|---|---|---|---|---|---|---|---|---|---|
| Example 1 | Si—SiC | SiC | 2 | Silica | 10 | immersion | 10 | 0.5 | 1.64 |
| Example 2 | Si—SiC | SiC | 2 | Silica | 8 | Application to fired body | 5 | 0.5 | 1.64 |
| Example 3 | Si—SiC | SiC | 20 | Si | 5 | Application to formed body | No blow off | 0.5 | 1.64 |

TABLE 1-1-continued

|  | Honeycomb structure segment material | Aggregate of filler | Average particle diameter of aggregate of filler (μm) | Binders in filler | Slurry viscosity mPa·sec | Filling method | Contact time with slurry (Sec) | Average outer peripheral side wall thickness (mm) | Average outer peripheral side wall thickness/ average partition walls thickness |
|---|---|---|---|---|---|---|---|---|---|
| Example 4 | Si—SiC | SiC | 2 | Silica | 8 | Application to fired body | 5 | 0.3 | 0.98 |
| Example 5 | Si—SiC | Alumina | 3 | None | 10 | Application to fired body | 10 | 0.3 | 0.98 |
| Example 6 | Si—SiC | Alumina | 3 | None | 12 | Application to fired body | 11 | 0.15 | 0.49 |
| Example 7 | Si—SiC | None | — | Si | — | Melting and impregnation with Si metal | — | 0.5 | 1.64 |
| Example 8 | Si—SiC | — | — | — | — | — | — | 0.16 | 0.52 |
| Example 9 | Si—SiC | — | — | — | — | — | — | 0.31 | 1.02 |
| Example 10 | Si—SiC | — | — | — | — | — | — | 0.36 | 1.18 |
| Comparative Example 1 | Si—SiC | — | — | — | — | — | — | 0.6 | 1.97 |
| Comparative Example 2 | Si—SiC |  |  |  |  |  |  | 0.14 | 0.46 |
| Comparative Example 3 | Si—SiC | — | — | — | — | — | — | 0.4 | 1.31 |

Remark: The silica as bonding material was colloidal silica with anaverage particle diameter of 300 nm or less.
Remark: After filling with the slurry, the slurry on the surface was blown off with air blow

TABLE 1-2

|  | Average porosity (%) | | | | | Percentage of pore volume in outer peripheral side wall to total pore volume (%) | Percentage of catalyst amount in outer peripheral side wall to total catalyst (%) | | Strength |
|---|---|---|---|---|---|---|---|---|---|
|  | A: Entire outer peripheral side wall | B: Outer 20% thickness region of outer peripheral side wall | C: Inner 10% thickness region of outer peripheral side wall | D: Outer peripheral side of outer peripheral side wall | E: Inner peripheral side of outer peripheral side wall |  |  |  |  |
| Example 1 | 15 | 5 | 62 | 38 | 58 | 3 | 1.9 | ○ | ○ |
| Example 2 | 20 | 5 | 63 | 35 | 60 | 3 | 1.9 | ○ | ○ |
| Example 3 | 10 | 10 | 63 | 45 | 61 | 7 | 4.5 | Δ | ○ |
| Example 4 | 20 | 5 | 62 | 25 | 60 | 2 | 1.3 | ○ | ○ |
| Example 5 | 8 | 5 | 59 | 25 | 57 | 2 | 1.3 | ○ | ○ |
| Example 6 | 35 | 2 | 63 | 20 | 60 | 1 | 0.6 | ○ | ○ |
| Example 7 | 11 | 1 | 45 | 3 | 35 | 0.5 | 0.3 | ○ | ○ |
| Example 8 | 63 | 62.5 | 63.2 | 63.2 | 63.2 | 2.9 | 1.8 | ○ | ○ |
| Example 9 | 63 | 62.5 | 63.2 | 63.2 | 63.2 | 5.7 | 3.6 | ○ | ○ |
| Example 10 | 63 | 62.5 | 63.2 | 63.2 | 63.2 | 6.6 | 4.2 | Δ | ○ |
| Comparative Example 1 | 63 | 62.5 | 63.2 | 63.2 | 63.2 | 11 | 7 | x | ○ |
| Comparative Example 2 | 63 | 62.5 | 63.2 | 63.2 | 63.2 | 2.6 | 1.7 | ○ | x |
| Comparative Example 3 | 63 | 62.5 | 63.2 | 63.2 | 63.2 | 7 | 5 | x | ○ |

DESCRIPTION OF REFERENCE NUMERALS

10 Filter
100 Honeycomb structure segment
102 Outer peripheral side wall
103 Outer peripheral wall
104 First end face
106 Second end face
107 Bonding material
108 First cell
110 Second cell
112 Partition wall

The invention claimed is:

1. A filter comprising a plurality of pillar-shaped honeycomb structure segments made of porous ceramics, side faces of the segments being bonded together via a bonding material, wherein each of the pillar-shaped honeycomb structure segments comprises an outer peripheral side wall, and partition walls partitioning a plurality of cells extending from a first end face to a second end face, and in each of the pillar-shaped honeycomb structure segments, an average porosity of the outer peripheral side wall is lower than that of the partition walls, and the outer peripheral side wall is such that an average porosity of a region having a thickness of 20% or more of the outer peripheral side wall inward from an outermost peripheral portion of the outer peripheral side wall is 25% or less of that of the partition walls.

2. The filter according to claim 1, wherein an average thickness of the outer peripheral side wall is 0.5 times or more and 1.2 times or less as thick as that of the partition walls.

3. The filter according to claim 1, wherein the outer peripheral side wall of each of the pillar-shaped honeycomb structure segments is such that, an average porosity of a region having a thickness of 50% of the outer peripheral side wall outward from an innermost peripheral portion of the outer peripheral side wall is higher than that of a region having a thickness of 50% of the outer peripheral side wall inward from an outermost peripheral portion of the outer peripheral side wall.

4. The filter according to claim 1, wherein in each of the pillar-shaped honeycomb structure segments, a difference between an average porosity of a region having a thickness of 10% of the outer peripheral side wall outward from an innermost peripheral portion of the outer peripheral side wall and an average porosity of the partition walls is within 5%.

5. The filter according to claim 1, wherein in each of the pillar-shaped honeycomb structure segments, at least a part of pores of the outer peripheral side wall is filled with a filler.

6. The filter according to claim 5, wherein the filler comprises aggregate particles, and the aggregate particles comprise as a main component one or a mixture of two or more selected from a group consisting of alumina, silica, zirconia, silicon carbide, aluminum titanate, silicon nitride, and cordierite.

7. The filter according to claim 5, wherein the filler comprises a metallic Si as a main component.

8. The filter according to claim 1, wherein a SCR (Selective Catalytic Reduction) catalyst is supported on the partition walls of each of the pillar-shaped honeycomb structure segments.

9. The filter according to claim 1, wherein the average porosity of the partition walls of each of the pillar-shaped honeycomb structure segments is 50% to 70%.

10. The filter according to claim 1, wherein an average pore diameter of the partition walls of each of the pillar-shaped honeycomb structure segments is 7 μm to 23 μm.

11. A method for manufacturing a filter according to claim 1, comprising:
   a step 1A of preparing a plurality of pillar-shaped honeycomb structure segments made of porous ceramics having an outer peripheral side wall and partition walls disposed on an inner side of the outer peripheral side wall and partitioning a plurality of cells extending from a first end face to a second end face;
   a step 2A of impregnating each of the pillar-shaped honeycomb structure segments made of porous ceramics with a slurry comprising aggregate particles and a solvent from an outermost peripheral portion of the outer peripheral side wall toward the inner side, and thereafter firing to obtain a plurality of pillar-shaped honeycomb structure segments made of porous ceramics in which an average porosity of the outer peripheral side wall is lower than that of the partition walls; and
   a step 3A of bonding via a bonding material side faces of the pillar-shaped honeycomb structure segments made of porous ceramics in which the average porosity of the outer peripheral side wall is lower than that of the partition walls.

12. The method for manufacturing a filter according to claim 11, wherein an average particle diameter of the aggregate particles is 2% to 60% of an average pore diameter of the outer peripheral side wall before the impregnation with the slurry.

13. A method for manufacturing a filter according to claim 1, comprising:
   a step 1B of preparing a plurality of pillar-shaped honeycomb structure segments made of porous ceramics having an outer peripheral side wall and partition walls disposed on an inner side of the outer peripheral side wall and partitioning a plurality of cells extending from a first end face to a second end face;
   a step 2B of impregnating each of the pillar-shaped honeycomb structure segments made of porous ceramics with a metallic Si from an outermost peripheral portion of the outer peripheral side wall toward the inner side, and thereafter firing to obtain a plurality of pillar-shaped honeycomb structure segments made of porous ceramics in which an average porosity of the outer peripheral side wall is lower than that of the partition walls; and
   a step 3B of bonding via a bonding material side faces of the pillar-shaped honeycomb structure segments made of porous ceramics in which the average porosity of the outer peripheral side wall is lower than that of the partition walls.

14. A method for manufacturing a filter according to claim 1, comprising:
   a step 1C of preparing a plurality of unfired pillar-shaped honeycomb structure segments having an outer peripheral side wall and partition walls disposed on an inner side of the outer peripheral side wall and partitioning a plurality of cells extending from a first end face to a second end face by forming and drying a green body;
   a step 2C of impregnating each of the unfired pillar-shaped honeycomb structure segments with a slurry comprising aggregate particles and a solvent from an outermost peripheral portion of the outer peripheral side wall toward the inner side;
   a step 3C of firing each of the unfired pillar-shaped honeycomb structure segments after the step 2C to obtain a plurality of pillar-shaped honeycomb structure segments made of porous ceramics in which an average porosity of the outer peripheral side wall is lower than that of the partition walls; and
   a step 4C of bonding via a bonding material side faces of the pillar-shaped honeycomb structure segments made of porous ceramics in which the average porosity of the outer peripheral side wall is lower than that of the partition walls.

15. The method for manufacturing a filter according to claim 14, wherein the step 2C comprises a step of entirely immersing each of the unfired pillar-shaped honeycomb structure segments in the slurry after sealing both of the end faces.

16. A method for manufacturing a filter according to claim 1, comprising:
   a step 1D of preparing a plurality of unfired pillar-shaped honeycomb structure segments having an outer peripheral side wall and partition walls disposed on an inner side of the outer peripheral side wall and partitioning a plurality of cells extending from a first end face to a second end face by forming and drying a green body;
   a step 2D of impregnating each of the unfired pillar-shaped honeycomb structure segments with a metallic Si from an outermost peripheral portion of the outer peripheral side wall toward the inner side;
   a step 3D of firing each of the unfired pillar-shaped honeycomb structure segments after the step 2D to obtain a plurality of pillar-shaped honeycomb structure segments made of porous ceramics in which an average porosity of the outer peripheral side wall is lower than that of the partition walls; and
   a step 4D of bonding via a bonding material side faces of the pillar-shaped honeycomb structure segments made of porous ceramics in which the average porosity of the outer peripheral side wall is lower than that of the partition walls.

* * * * *